US010379416B2

(12) United States Patent
Yu et al.

(10) Patent No.: US 10,379,416 B2
(45) Date of Patent: Aug. 13, 2019

(54) THIN FILM TRANSISTOR SUBSTRATE AND DISPLAY DEVICE USING SAME

(71) Applicant: Century Technology (Shenzhen) Corporation Limited, Shenzhen (CN)

(72) Inventors: Wen-Qiang Yu, Shenzhen (CN); Ming-Tsung Wang, New Taipei (TW); Chih-Chung Liu, New Taipei (TW); Yi-Hsiu Cheng, New Taipei (TW)

(73) Assignee: Century Technology (Shenzhen) Corporation Limited, Shenzhen (CN)

( * ) Notice: Subject to any disclaimer, the term of this patent is extended or adjusted under 35 U.S.C. 154(b) by 295 days.

(21) Appl. No.: 14/826,645

(22) Filed: Aug. 14, 2015

(65) Prior Publication Data

US 2016/0306244 A1 Oct. 20, 2016

(30) Foreign Application Priority Data

Apr. 15, 2015 (CN) .......................... 2015 1 0177213

(51) Int. Cl.

| | |
|---|---|
| ***G02F 1/1343*** | (2006.01) |
| ***G02F 1/1362*** | (2006.01) |
| ***G02F 1/1339*** | (2006.01) |
| *G02F 1/1333* | (2006.01) |

(52) U.S. Cl.

CPC ...... *G02F 1/136286* (2013.01); *G02F 1/1339* (2013.01); *G02F 1/136213* (2013.01); *G02F 2001/133388* (2013.01)

(58) Field of Classification Search

CPC ......... G02F 1/136213; G02F 1/136286; G02F 2001/133388

See application file for complete search history.

(56) References Cited

U.S. PATENT DOCUMENTS

| | | | | |
|---|---|---|---|---|
| 7,061,553 | B2 * | 6/2006 | Taguchi | G02F 1/136213 349/141 |
| 7,898,635 | B2 * | 3/2011 | Yim | G02F 1/1339 349/153 |
| 8,049,853 | B2 * | 11/2011 | Park | G02F 1/1339 349/139 |
| 8,368,630 | B2 * | 2/2013 | Lee | G02F 1/134309 345/104 |
| 8,514,363 | B2 * | 8/2013 | Kim | G02F 1/1339 349/153 |
| 8,743,306 | B2 * | 6/2014 | Kim | G02F 1/136286 349/33 |

FOREIGN PATENT DOCUMENTS

| | | | |
|---|---|---|---|
| CN | 101281325 | A | 10/2008 |
| CN | 102193259 | A | 9/2011 |

* cited by examiner

*Primary Examiner* — Paisley L Arendt

(74) *Attorney, Agent, or Firm* — ScienBiziP, P.C.

(57) ABSTRACT

A display device includes a display area and a peripheral area surrounding the display area. The display device includes a thin film transistor substrate, a plurality of thin film transistors, a first common line, and a storage capacitor line. The first common line, the storage capacitor, and a gate electrode of the thin film transistor are located in a same layer. The first common line is directly electrically coupled to the storage capacitor line.

1 Claim, 4 Drawing Sheets

THIN FILM TRANSISTOR SUBSTRATE AND DISPLAY DEVICE USING SAME

CROSS-REFERENCE TO RELATED APPLICATIONS

This application claims priority to Chinese Patent Application No. 201510177213.6 filed on Apr. 15, 2015 in the China Intellectual Property Office, the contents of which are incorporated by reference herein.

FIELD

The subject matter herein generally relates to a thin film transistor substrate and a display device using same.

BACKGROUND

A display device can include a thin film transistor substrate, a counter substrate, and a liquid crystal layer arranged between the thin film transistor substrate and the counter substrate. The thin film transistor substrate can include a plurality of data lines, a plurality of scanning lines, a storage capacitor, and a plurality of common lines. The plurality of common lines are arranged in a peripheral area of the thin film transistor substrate and the storage capacitor is arranged in a display area of the thin film transistor substrate. The plurality of common lines and the storage capacitor are arranged in different layers of the substrate. Each of the plurality of common lines is electrically coupled to the storage capacitor via a conductive bridge. A coupling capacitance may be generated between the conductive bridge and the common line.

BRIEF DESCRIPTION OF THE DRAWINGS

Implementations of the present technology will now be described, by way of example only, with reference to the attached figures, wherein.

DETAILED DESCRIPTION

Figure 1:
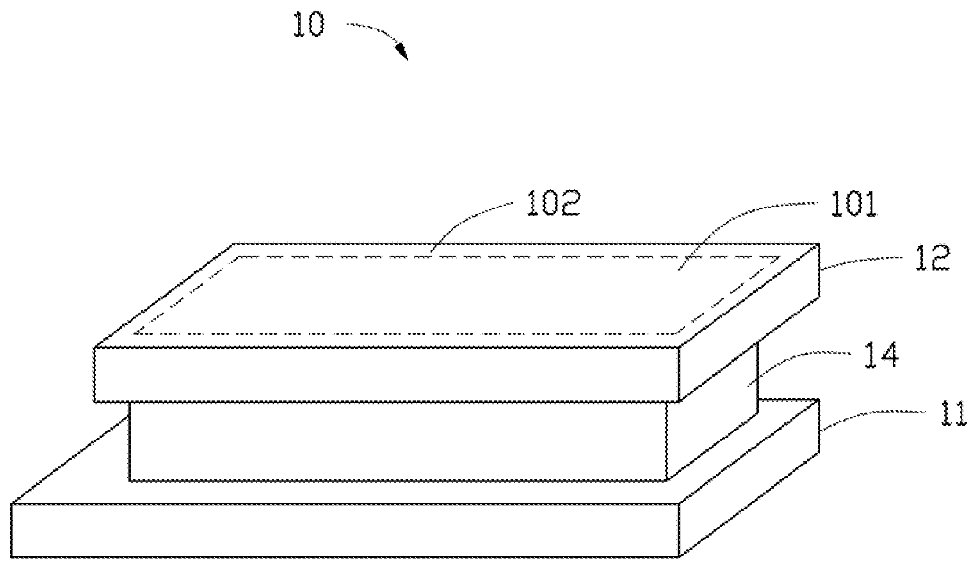
FIG. 1 is an isometric view of a display device having a thin film transistor substrate according to an exemplary disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

Figure 3:
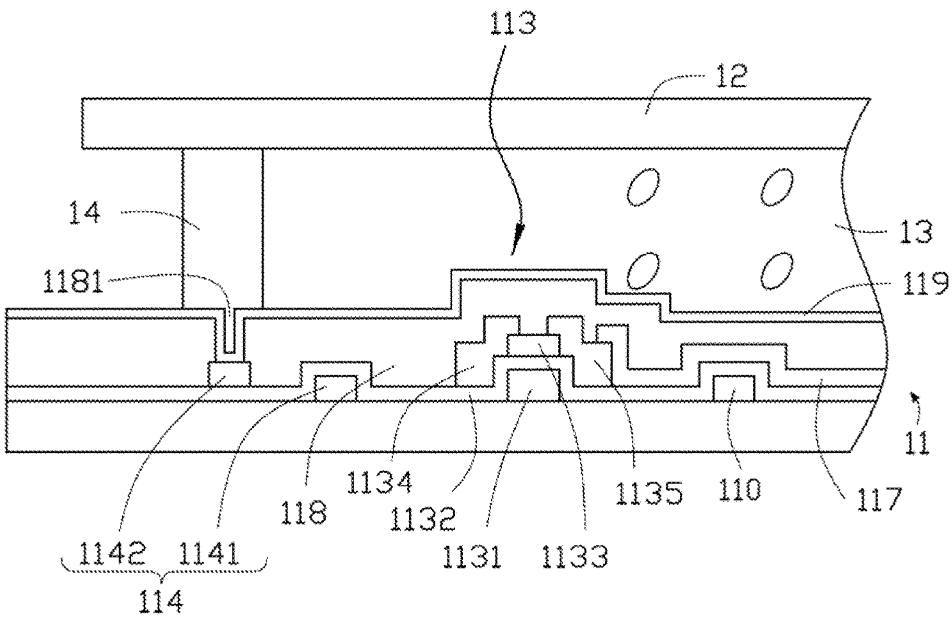
FIG. 3 is a sectional view of the display device taken along line III-III of FIG. 1.

FIG. 1 illustrates that a display device 10 can include a thin film transistor substrate 11, a counter substrate 12 arranged opposite to the thin film transistor substrate 11, a liquid crystal layer 13 (as shown in FIG. 3), and a sealant 14. The liquid crystal layer 13 is arranged between the thin film transistor substrate 11 and the counter substrate 12. The sealant 14 is disposed between the thin film transistor substrate 11 and the counter substrate 12 and encapsulates the liquid crystal layer 13 to seal liquid crystal material of the liquid crystal layer 13. The display device 10 includes a display area 101 located in a center of the display device 1 and a peripheral area 102 surrounding the display area 101.

Figure 2:
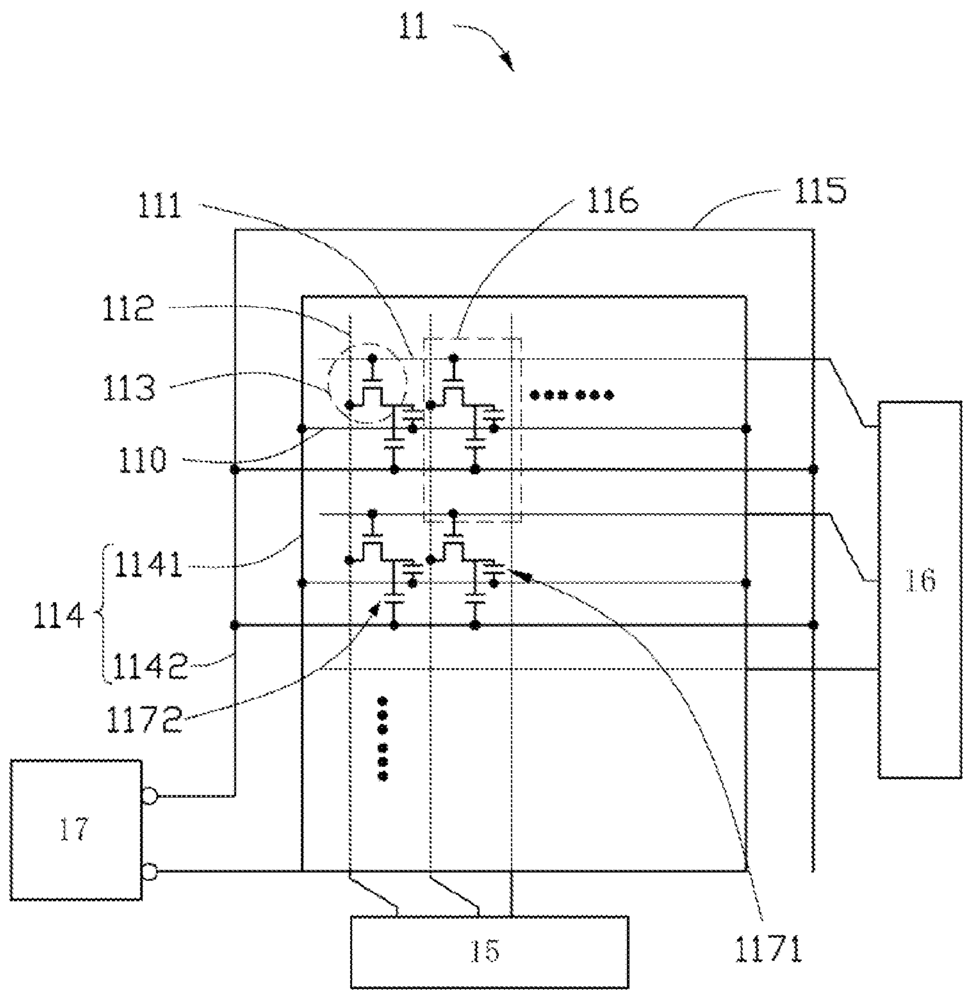
FIG. 2 is a planar layout of the thin film transistor of the display device of FIG. 1.

FIG. 2 illustrates that the thin film transistor substrate 11 can include a data driver 15, a scanning driver 16, and a power supply circuit 17. The thin film transistor substrate 11 can include a plurality of storage capacitor lines 110, a plurality of scanning lines 111, a plurality of data lines 112, a plurality of thin film transistors 113, a plurality of common lines 114, and a base 115. The scanning lines 111 are parallel to each other. One end of each of the scanning lines 111 is electrically coupled to the scanning driver 16, and the other end of each of the scanning lines 111 is coupled to the thin film transistor 113. The data lines 112 are parallel to each other and intersect with, but are isolated from, the scanning lines 111. One end of each of the data lines 112 is electrically coupled to the data driver 15, and the other end of the each of the data lines 112 is coupled to the thin film transistor 113. The scanning driver 16 outputs scanning signals to the scanning lines 111. The data driver 15 outputs gray scale voltages to the data lines 112. The data lines 112 and the scanning lines 111 define a plurality of pixel areas 116 in which the data lines 112 intersect with the scanning lines 111. Each of the thin film transistors 113 is arranged in one of the pixel areas 116. The storage capacitor lines 110 are arranged on the base 115 parallel to the scanning lines 111.

FIG. 2 and FIG. 3 illustrate that the thin film transistor substrate 11 can further include a plurality of pixel electrodes 117. Each of the pixel electrodes 117 is electrically coupled to one of the thin film transistors 113. A storage capacitor 1171 is formed between the pixel electrode 117 in the pixel area 116 and the storage capacitor line 110. A liquid crystal capacitor 1172 is formed between the pixel electrode 117 and a common electrode layer 119 of the display device 10.

Each of the common lines 114 is located in the peripheral area 102. A common line 114 can include a first common line 1141 and a second common line 1142 located in the base 115. The first common line 1141 surrounds the display area 101. The second common line 1142 is located between the first common line 1141 and an edge of the base 115. The second common line 1142 forms a semi-closed rectangle having an opening which faces the data driver 15. The first common line 1141 can be an enclosed rectangle. The storage capacitor line 110 is directly electrically coupled to the first common line 1141. In the illustrated embodiment, ends of each storage capacitor line 110 extend to connect to the first common line 1141.

Further Referring to FIG. 3, the thin film transistor 113 can include a gate electrode 1131, a gate insulating layer 1132, a channel layer 1133, a source electrode 1134, and a drain electrode 1135. The gate electrode 1131 is located on the base 115. The gate insulating layer 1132 is located on the base 115 to cover the first common line 1141, the storage capacitor line 110, and the gate electrode 1131. The channel layer 1133 is located on the gate insulating layer 1132 corresponding to the gate electrode 1131. The source electrode 1134 and the drain electrode 1135 are at opposite ends of the channel layer 1133. The second common line 1142 is formed on the gate insulating layer 1132. The pixel electrode 117 is located on the gate insulating layer 1132 and electrically coupled to the drain electrode 1135.

The thin film transistor substrate 11 can further include a passivation layer 118 and the common electrode layer 119. The passivation layer 118 covers the thin film transistor 113 and the second common line 1142. The common electrode layer 119 is located on the passivation layer 118 and covers the passivation layer 118. In the embodiment, the pixel electrode 117 and the common electrode layer 119 are made of the same material, such as Indium Tin Oxide (ITO) or Indium Zinc Oxide (IZO).

The first common line 1141 is located between the gate insulating layer 1132 and the base 115. The first common line 1141 and the gate electrode 1131 are both located in a same layer and can be made in a same manufacturing process. In at least one embodiment, both the first common line 1141 and the gate electrode 1131 are formed on and are in contact with a surface of the base 115 adjacent to the gate insulation layer 1132. The second common line 1142 is located between the gate insulating layer 1132 and the passivation layer 118. The passivation layer 118 can include a contact hole 1181 to expose the second common line 1142. The common electrode layer 119 is electrically coupled to the second common line 1142 via the contact hole 1181. The second common line 1142, the source electrode 1134, and the drain electrode 1135 are located in a same layer and made in a same manufacturing process. In at least one embodiment, the second common 1142, the source electrode 1134, and the drain electrode 1135 are deposited on the gate insulating layer 1132. The storage capacitor line 110 is located between the gate insulating layer 1132 and the base 115. The storage capacitor line 110, the first common line 1141, and the gate electrode 1131 are located in a same layer and made in a same manufacturing process. In at least one embodiment, the storage capacitor line 110, the first common line 1141, and the electrode 1131 are deposited on the base 115.

Figure 4:
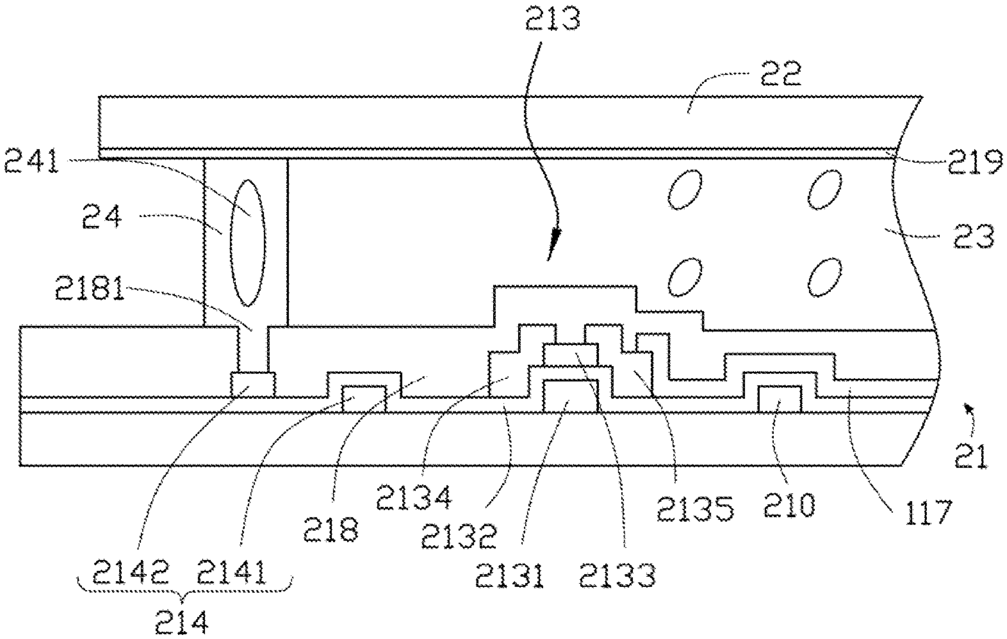
FIG. 4 is a sectional view of the display device taken along line IV-IV of FIG. 1.

FIG. 4 illustrates a display device 20 can include a thin film transistor substrate 21, a counter substrate 22, a liquid crystal layer 23, and a sealant 24. The liquid crystal layer 23 is arranged between the thin film transistor substrate 21 and the counter substrate 22. The sealant 24 is disposed between the thin film transistor substrate 21 and the counter substrate 22 and forms a seal around the liquid crystal layer 23 to seal liquid crystal material of the liquid crystal layer 23.

The thin film transistor substrate 21 can include a plurality of storage capacitor lines 210, a plurality of thin film transistors 213, a common line 214, a base 215, and a pixel electrode 217. The storage capacitor line 210, the thin film transistor 213, the common line 214, and the pixel electrode 217 are arranged on the base 215.

The thin film transistor 213 can further include a gate electrode 2131, a gate insulating layer 2132, a channel layer 2133, a source electrode 2134, and a drain electrode 2135. The gate electrode 2131 is located on the base 215. The gate insulating layer 2132 covers the gate electrode 2131 and the second base 215. The channel layer 2133 is located on the gate insulating layer 2132 corresponding to the gate electrode 2131. The source electrode 2134 and the drain electrode 2135 are arranged at opposite ends of the channel layer 2133. The pixel electrode 217 is located on the gate insulating layer 2132 and electrically coupled to the drain electrode 2135.

The thin film transistor substrate 21 can further include a passivation layer 218 and a common electrode layer 219. The passivation layer 218 is located on the base 215 to cover the gate insulating layer 2132, the channel layer 2133, the source electrode 2134, the drain electrode 2135, and the pixel electrode 217. The common electrode layer 219 is located at the counter substrate 22 adjacent to the liquid crystal layer 23.

The common line 214 can include a first common line 2141 and a second common line 2142. The first common line 2141 and the second common line 2142 are located at the base 215. The first common line 2141 is located between the gate insulating layer 2132 and the base 215. The first common line 2141 and the gate electrode 2131 are located in a same layer and can be made in a same manufacturing process. In one or more embodiment, the first common line 2141 and the gate electrode 2131 are formed on and are in contact with a surface of the base 215 adjacent to the gate insulation layer 2132. The second common line 2142 is located between the gate insulating layer 2132 and the passivation layer 218. The passivation layer 218 can include a contact hole 2181 to expose the second common line 2142. The common electrode layer 219 is electrically coupled to the second common line 2142 via the contact hole 2181. The second common line 2142, the source electrode 2134, and the drain electrode 2135 are located in a same layer and made in a same manufacturing process. In one or more embodiment, the second common line 2142, the source electrode 2134, and the drain electrode 2135 are deposited on the gate insulating layer 2132. The storage capacitor line 210 is located between the gate insulating layer 2132 and the base 215. The storage capacitor line 210, the first common line 2141, and the gate electrode 2131 are located in a same layer and made in a same manufacturing process. In one or more embodiment, the storage capacitor line 210, the first common line 2141, and the electrode 2131 are deposited on the base 215.

The sealant 24 can include conductive particles 241 corresponding to the contact hole 2181. The second common line 2142 is electrically coupled to the common electrode layer 219 via the conductive particles 241.

The first common line and the storage capacitor are located in a same layer, thus a conductive bridge between the first common line and the storage capacitor is not required, and the formation of a coupling capacitance is rendered less likely.

It is to be understood that even though numerous characteristics and advantages of the present embodiments have been set forth in the foregoing description, with details of the structures and functions of the embodiments, the disclosure is illustrative only; and changes may be in detail, especially in the matter of arrangement of parts within the principles of the embodiments to the full extent indicated by the broad general meaning of the terms in which the appended claims are expressed.

What is claimed is:

1. A display device, defining a display area and a peripheral area surrounding the display area, the display device comprising:

a thin film transistor substrate comprising a base and a plurality of thin film transistors on the base and in the display area, each of the plurality of thin film transistors comprising a gate electrode on the base;

a first common line on the base and in the peripheral area; and a storage capacitor line on the base and in the display area;

a gate insulating layer on the base and covering the first common line, the storage capacitor line, and the gate electrode of each of the plurality of thin film transistors;

a second common line formed on a side of the gate insulating layer away from the base and in the peripheral area;

a counter substrate facing the thin film transistor substrate;

a common electrode layer formed on a side of the counter substrate adjacent to the thin film transistor substrate and in the display area; and a sealant disposed between the thin film transistor substrate and the counter substrate to seal a liquid crystal layer between the thin film transistor substrate and the counter substrate;

wherein the first common line, the storage capacitor line, and the gate electrode of each of the plurality of thin film transistors are located in a same layer and defined by a same conductive layer;

wherein the first common line is in direct contact with the storage capacitor line and electrically coupled to the storage capacitor line;

wherein conductive particles are embedded in the sealant; the common electrode layer is electrically coupled to the second common line by the conductive particles;

wherein the second common line is electrically insulated from the first common line;

wherein the first common line surrounds the display area; the second common line surrounds the first common line; and wherein the second common line forms a semi-closed rectangle having an opening, the second common line has an end electrically coupled to a power supply circuit and another end spaced apart from the power supply circuit.

* * * * *